United States Patent
Davila et al.

(10) Patent No.: US 12,387,310 B2
(45) Date of Patent: Aug. 12, 2025

(54) WAFER SIGNATURE LOCAL MAXIMA VIA CLUSTERING FOR METROLOGY GUIDED INSPECTION

(71) Applicant: KLA Corporation, Milpitas, CA (US)

(72) Inventors: Alan Davila, El Paso, TX (US); Marcus Liesching, Boulder Creek, CA (US); Sandeep Bhagwat, Milpitas, CA (US); Surya Vanamali, San Jose, CA (US); Suresh Selvaraj, Fremont, CA (US); Sravani Desu, Andhra Pradesh (IN); Ganesh Meenakshisundaram, Austin, TX (US); Karthik Purushothaman, Chennai (IN); Ardis Liang, Pleasanton, CA (US)

(73) Assignee: KLA Corporation, Milpitas, CA (US)

( * ) Notice: Subject to any disclaimer, the term of this patent is extended or adjusted under 35 U.S.C. 154(b) by 0 days.

(21) Appl. No.: 18/438,382

(22) Filed: Feb. 9, 2024

(65) Prior Publication Data
US 2024/0362765 A1  Oct. 31, 2024

Related U.S. Application Data

(60) Provisional application No. 63/472,596, filed on Jun. 13, 2023.

(30) Foreign Application Priority Data

Apr. 29, 2023  (IN) ............ 202341030828.0

(51) Int. Cl.
  *G06T 7/00* (2017.01)
  *G06T 7/11* (2017.01)
(52) U.S. Cl.
  CPC ........... *G06T 7/0004* (2013.01); *G06T 7/11* (2017.01); *G06T 2207/20081* (2013.01); *G06T 2207/30148* (2013.01)

(58) Field of Classification Search
  CPC ........... G06T 7/0004; G06T 7/11; G06T 2207/20081; G06T 2207/30148
  See application file for complete search history.

(56) References Cited

U.S. PATENT DOCUMENTS

| 8,126,255 B2 | 2/2012 | Bhaskar et al. |
| 8,664,594 B1 | 4/2014 | Jiang et al. |

(Continued)

FOREIGN PATENT DOCUMENTS

KR  10-2020-0089618  7/2020

OTHER PUBLICATIONS

International Search Report and Written Opinion for PCT/2024/024696 mailed Aug. 13, 2024.

(Continued)

*Primary Examiner* — Bobbak Safaipour
(74) *Attorney, Agent, or Firm* — Entropy Matters LLC (57) ABSTRACT

Methods and systems for generating information for use in setting up a process performed on a specimen are provided. One method includes clustering dies on a specimen based on colors assigned to the dies responsive to predicted defect densities in the dies determined from measurements performed on the specimen thereby generating initial die clusters. The method also includes analyzing the initial die clusters in location space to determine if any of the initial die clusters contain two or more die clusters. In addition, the method includes designating the initial die clusters that do not contain two or more die clusters and the two or more die clusters contained in any of the initial die clusters as the final die clusters. The method further includes storing information for the final die clusters for use in setting up a process performed on the specimen.

20 Claims, 4 Drawing Sheets

(56) References Cited

U.S. PATENT DOCUMENTS

| | | | |
|---|---|---|---|
| 8,692,204 B2 | 4/2014 | Kojima et al. | |
| 8,698,093 B1 | 4/2014 | Gubbens et al. | |
| 8,716,662 B1 | 5/2014 | MacDonald et al. | |
| 9,222,895 B2 | 12/2015 | Duffy et al. | |
| 9,816,939 B2 | 11/2017 | Duffy et al. | |
| 2010/0057391 A1 | 3/2010 | St. Pierre et al. | |
| 2010/0297785 A1 | 11/2010 | Guenter-Zimmer et al. | |
| 2019/0346375 A1* | 11/2019 | Anantha | G01N 21/9501 |
| 2019/0370955 A1* | 12/2019 | Zhang | G06F 18/2431 |
| 2020/0226743 A1 | 7/2020 | Savchenko et al. | |
| 2020/0372631 A1 | 11/2020 | Asbag et al. | |
| 2020/0388545 A1* | 12/2020 | Honda | G06N 20/00 |
| 2021/0383557 A1* | 12/2021 | Brauer | G06T 7/001 |
| 2022/0189830 A1 | 6/2022 | Beyne et al. | |
| 2022/0335290 A1* | 10/2022 | Pisarenco | G06N 3/045 |

OTHER PUBLICATIONS

Arthur et al., "k-means++: The Advantages of Careful Seeding," Stanford InfoLab 8090, 778, 2006, 11 pages.

Ester et al., "A Density-Based Algorithm for Discovering Clusters," KDD'96: Proceedings of the Second International Conference on Knowledge Discovery and Data Mining, Aug. 2, 1996, pp. 226-231.

Schubert et al., "DBSCAN Revisited, Revisited: Why and How You Should (Still) Use DBSCAN," ACM Trans. Database Syst. 42, 3, Article 19 (Jul. 2017), 21 pages.

* cited by examiner

Fig. 7

WAFER SIGNATURE LOCAL MAXIMA VIA CLUSTERING FOR METROLOGY GUIDED INSPECTION

BACKGROUND OF THE INVENTION

1. Field of the Invention

The present invention generally relates to methods and systems for generating information for use in setting up a process performed on a specimen. Certain embodiments relate to wafer signature local maxima via clustering for metrology guided inspection.

2. Description of the Related Art

The following description and examples are not admitted to be prior art by virtue of their inclusion in this section.

Fabricating semiconductor devices such as logic and memory devices typically includes processing a substrate such as a semiconductor wafer using a large number of semiconductor fabrication processes to form various features and multiple levels of the semiconductor devices. For example, lithography is a semiconductor fabrication process that involves transferring a pattern from a reticle to a resist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer and then separated into individual semiconductor devices.

Inspection processes are used at various steps during a semiconductor manufacturing process to detect defects on wafers to promote higher yield in the manufacturing process and thus higher profits. Inspection has always been an important part of fabricating semiconductor devices. However, as the dimensions of semiconductor devices decrease, inspection becomes even more important to the successful manufacture of acceptable semiconductor devices.

Inspection tools have various parameters that can be altered based on the specimen that is being inspected. The alterable parameters often include imaging hardware parameters and image processing related parameters. While altering parameters of the tool from specimen-to-specimen can be advantageous, determining the correct parameters for any one specimen can be particularly difficult.

Many approaches have been developed to not only determine which inspection parameters are appropriate for a given specimen, but also which inspection parameters are appropriate for different areas on the same specimen in the same inspection. For example, variation across the specimens described herein may mean that inspection parameters that are most suitable in one specimen area are less than optimal or even completely useless in another specimen area.

Methods for selecting inspection parameters that vary from specimen area to specimen area have been developed based on a number of characteristics of the specimens and the tools. Some specimen characteristics that have been considered primarily relate to a design formed on the specimen, including characteristics of patterned features in the design and where they are formed on the specimen. The characteristics of the design that may be used include characteristics that are independent of the inspection tool and process like which of the patterned features in the design are most critical to the device function and therefore should be inspected with the greatest sensitivity. The characteristics of the design may also or alternatively include characteristics of the design like dimensions, orientation, roughness, material properties, patterned features on underlying layers, etc., which can have some effect on the inspection tool output and so can affect both the signal and the noise in the inspection tool output.

Some other specimen characteristics that have been considered relate to noise in the inspection tool output for different areas on the specimen. That noise may be related to the design being formed on the specimen as described above. The noise may also be related to other properties of the specimen like variations in the specimen caused by a process performed on the specimen. One obvious reason why inspection parameters may be based on noise is that the noise can mask defect signals. For example, if the noise is too similar to the defect signals or even exceeds the defect signals, the defect signals may be missed and inspection may fail.

While it may seem relatively straightforward, these and other specimen characteristics as well as the inspection tool configuration and its specimen-dependent performance make setting up an inspection process fairly complicated. For example, if one is only using the design information for inspection setup, even that setup can be complex due to the complexity of the design and how it can affect the inspection tool output. In an additional example, it is increasingly difficult to predict the noise that will be present on a specimen and how it may vary across the specimen, which makes noise-related inspection setup difficult. When a combination of factors are considered in inspection process setup, setup difficulty increases, possibly exponentially, with the number of variables.

Other factors that can complicate inspection recipe setup include performance considerations and requirements. For example, the fastest inspection processes generally involve the fewest different parameters per specimen. In particular, if an inspection process includes inspection with different sets of parameters, that will generally take longer than if the same inspection can be performed with only one set of parameters. Similarly, the inspection process will generally take longer the more the parameters have to be switched, e.g., from area to area on the specimen. Therefore, some inspection recipe setup processes have focused on how to group areas on the specimen that are similar in the characteristics described above. Inspection recipe setup methods may also or alternatively focus on how to meet the inspection goals (e.g., total defect capture rate, specific defect of interest (DOI) capture rates, nuisance detection rates, etc.) in the minimum amount of time. These methods may explore the possibility of trading performance for throughput.

While inspection recipe setup has made significant strides in the last few decades many challenges remain. For example, it has become increasingly difficult to predict how the specimen itself will affect the inspection tool output because of the increasing complexity of the specimen designs and their ever decreasing pattern size. In addition, the defects of interest are only becoming smaller and smaller, which makes detecting them ever more difficult especially as most inspection tools are being pushed to or used at the limits of their performance entitlements. Those factors as well as how much the specimen can vary across the specimen also make creating an inspection recipe that performs adequately across the entire specimen especially challenging.

Accordingly, it would be advantageous to develop systems and methods for generating information for use in setting up a process performed on a specimen that do not have one or more of the disadvantages described above.

SUMMARY OF THE INVENTION

The following description of various embodiments is not to be construed in any way as limiting the subject matter of the appended claims.

One embodiment relates to a system configured for generating information for use in setting up a process performed on a specimen. The system includes one or more computer systems configured for clustering dies on a specimen based on colors assigned to the dies responsive to predicted defect densities in the dies determined from measurements performed on the specimen thereby generating initial die clusters. The one or more computer systems are also configured for analyzing the initial die clusters in location space to determine if any of the initial die clusters contain two or more die clusters. In addition, the one or more computer systems are configured for designating the initial die clusters that do not contain two or more die clusters and the two or more die clusters contained in any of the initial die clusters as final die clusters. The one or more computer systems are further configured for storing information for the final die clusters for use in setting up a process performed on the specimen. The system may be further configured as described herein.

Another embodiment relates to a computer-implemented method for generating information for use in setting up a process performed on a specimen. The method includes the clustering, analyzing, designating, and storing steps described above. The steps of the method are performed by one or more computer systems. The steps of the method may be further performed as described herein. The method may include any other step(s) of any other method(s) described herein. The method may be performed by any of the systems described herein.

Another embodiment relates to a non-transitory computer-readable medium storing program instructions executable on a computer system for performing a computer-implemented method for generating information for use in setting up a process performed on a specimen. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

BRIEF DESCRIPTION OF THE DRAWINGS

Further advantages of the present invention will become apparent to those skilled in the art with the benefit of the following detailed description of the preferred embodiments and upon reference to the accompanying drawings in which.

While the invention is susceptible to various modifications and alternative forms, specific embodiments thereof are shown by way of example in the drawings and are herein described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

One embodiment relates to a system configured for generating information for use in setting up a process performed on a specimen. In some embodiments, the specimen is a wafer. The wafer may include any wafer known in the semiconductor arts. Although some embodiments may be described herein with respect to a wafer or wafers, the embodiments are not limited in the specimens for which they can be used. For example, the embodiments described herein may be used for specimens such as reticles, flat panels, personal computer (PC) boards, and other semiconductor specimens.

Figure 1:
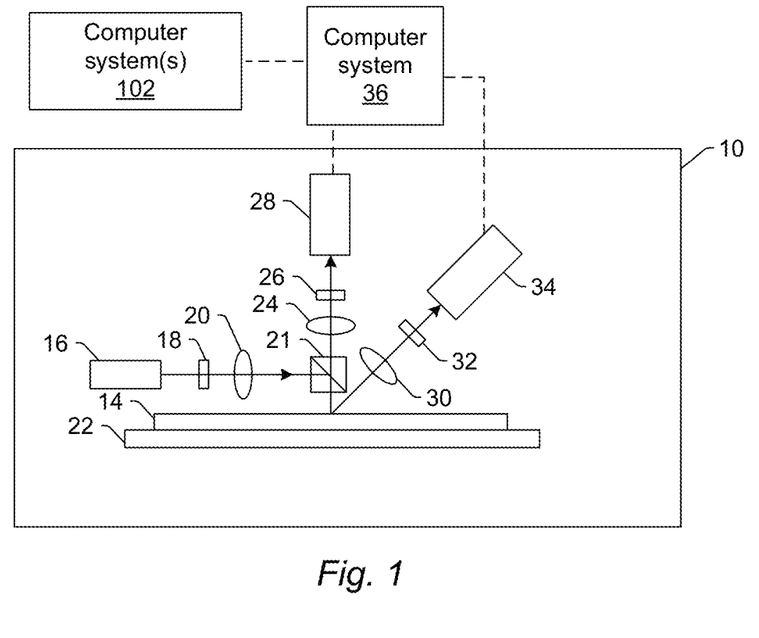
FIGS. 1 and 2 are schematic diagrams illustrating side views of embodiments of a system configured as described herein.

One embodiment of such a system is shown in FIG. 1. The system may include an imaging system that includes at least an energy source and a detector. The energy source is configured to generate energy that is directed to a specimen. The detector is configured to detect energy from the specimen and to generate output responsive to the detected energy.

In one embodiment, the energy directed to the specimen includes light, and the energy detected from the specimen includes light. For example, as shown in FIG. 1, imaging system 10 includes an illumination subsystem configured to direct light to specimen 14. The illumination subsystem includes at least one light source, e.g., light source 16. The illumination subsystem is configured to direct the light to the specimen at one or more angles of incidence, which may include one or more oblique angles and/or one or more normal angles. For example, as shown in FIG. 1, light from light source 16 is directed through optical element 18 and then lens 20 to beam splitter 21, which directs the light to specimen 14 at a normal angle of incidence. The angle of incidence may include any suitable angle of incidence, which may vary depending on, for instance, characteristics of the specimen, the defects to be detected on the specimen, the measurements to be performed on the specimen, etc.

The illumination subsystem may be configured to direct the light to the specimen at different angles of incidence at different times. For example, the imaging system may be configured to alter one or more characteristics of one or more elements of the illumination subsystem such that the light can be directed to the specimen at an angle of incidence that is different than that shown in FIG. 1. In one such example, the imaging system may be configured to move light source 16, optical element 18, and lens 20 such that the light is directed to the specimen at a different angle of incidence.

The imaging system may be configured to direct light to the specimen at more than one angle of incidence at the same time. For example, the imaging system may include more than one illumination channel, one of the illumination channels may include light source 16, optical element 18, and lens 20 as shown in FIG. 1 and another of the illumination channels (not shown) may include similar elements, which may be configured differently or the same, or may include at least a light source and possibly one or more other components such as those described further herein. If such light is directed to the specimen at the same time as the other light, one or more characteristics (e.g., wavelength, polarization, etc.) of the light directed to the specimen at different angles of incidence may be different such that light resulting from illumination of the specimen at the different angles of incidence can be discriminated from each other at the detector(s).

The illumination subsystem may however include only one light source (e.g., source 16 shown in FIG. 1) and light from the light source may be separated into different optical paths (e.g., based on wavelength, polarization, etc.) by one or more optical elements (not shown) of the illumination subsystem. Light in each of the different optical paths may then be directed to the specimen. Multiple illumination channels may be configured to direct light to the specimen at the same time or at different times (e.g., when different illumination channels are used to sequentially illuminate the specimen). In another instance, the same illumination channel may be configured to direct light to the specimen with different characteristics at different times. For example, optical element 18 may be configured as a spectral filter and the properties of the spectral filter can be changed in a variety of different ways (e.g., by swapping out the spectral filter) such that different wavelengths of light can be directed to the specimen at different times. The illumination subsystem may have any other suitable configuration known in the art for directing light having different or the same characteristics to the specimen at different or the same angles of incidence sequentially or simultaneously.

Light source 16 may include a broadband plasma (BBP) light source. In this manner, the light generated by the light source and directed to the specimen may include broadband light. However, the light source may include any other suitable light source such as any suitable laser known in the art configured to generate light at any suitable wavelength(s) known in the art. In addition, the laser may be configured to generate light that is monochromatic or nearly-monochromatic. As such, the laser may be a narrowband laser. The light source may also include a polychromatic light source that generates light at multiple discrete wavelengths or wavebands.

Light from optical element 18 may be focused to beam splitter 21 by lens 20. Although lens 20 is shown in FIG. 1 as a single refractive optical element, in practice, lens 20 may include a number of refractive and/or reflective optical elements that in combination focus the light from the optical element to the specimen. The illumination subsystem shown in FIG. 1 and described herein may include any other suitable optical elements (not shown). Examples of such optical elements include, but are not limited to, polarizing component(s), spectral filter(s), spatial filter(s), reflective optical element(s), apodizer(s), beam splitter(s), aperture(s), and the like, which may include any such suitable optical elements known in the art. In addition, the system may be configured to alter one or more elements of the illumination subsystem based on the type of illumination to be used for inspection, metrology, etc.

The imaging system may also include a scanning subsystem configured to cause the light to be scanned over the specimen. For example, the imaging system may include stage 22 on which specimen 14 is disposed during inspection, measurement, etc. The scanning subsystem may include any suitable mechanical and/or robotic assembly (that includes stage 22) that can be configured to move the specimen such that the light can be scanned over the specimen. In addition, or alternatively, the imaging system may be configured such that one or more optical elements of the imaging system perform some scanning of the light over the specimen. The light may be scanned over the specimen in any suitable fashion.

The imaging system further includes one or more detection channels. At least one of the one or more detection channels includes a detector configured to detect light from the specimen due to illumination of the specimen by the imaging system and to generate output responsive to the detected light. For example, the imaging system shown in FIG. 1 includes two detection channels, one formed by collector 24, element 26, and detector 28 and another formed by collector 30, element 32, and detector 34. As shown in FIG. 1, the two detection channels are configured to collect and detect light at different angles of collection. In some instances, one detection channel is configured to detect specularly reflected light, and the other detection channel is configured to detect light that is not specularly reflected (e.g., scattered, diffracted, etc.) from the specimen. However, two or more of the detection channels may be configured to detect the same type of light from the specimen (e.g., specularly reflected light). Although FIG. 1 shows an embodiment of the imaging system that includes two detection channels, the imaging system may include a different number of detection channels (e.g., only one detection channel or two or more detection channels). Although each of the collectors are shown in FIG. 1 as single refractive optical elements, each of the collectors may include one or more refractive optical element(s) and/or one or more reflective optical element(s).

The one or more detection channels may include any suitable detectors known in the art such as photo-multiplier tubes (PMTs), charge coupled devices (CCDs), and time delay integration (TDI) cameras. The detectors may also include non-imaging detectors or imaging detectors. If the detectors are non-imaging detectors, each of the detectors may be configured to detect certain characteristics of the scattered light such as intensity but may not be configured to detect such characteristics as a function of position within the imaging plane. As such, the output that is generated by each of the detectors included in each of the detection channels may be signals or data, but not image signals or image data. In such instances, a computer system such as computer system 36 of the system may be configured to generate images of the specimen from the non-imaging output of the detectors. However, in other instances, the detectors may be configured as imaging detectors that are configured to generate imaging signals or image data. Therefore, the system may be configured to generate images in a number of ways.

FIG. 1 is provided herein to generally illustrate a configuration of an imaging system that may be included in the system embodiments described herein. Obviously, the imaging system configuration described herein may be altered to optimize the performance of the system as is normally performed when designing a commercial inspection, metrology, etc. system. In addition, the systems described herein may be implemented using an existing inspection or metrology system (e.g., by adding functionality described herein to an existing inspection or metrology system) such as the 29xx and 39xx series of tools, the SpectraShape family of tools, and the Archer series of tools that are commercially available from KLA Corp., Milpitas, Calif. For some such systems, the embodiments described herein may be provided as optional functionality of the inspection or metrology system (e.g., in addition to other functionality of the inspection or metrology system). Alternatively, the imaging system described herein may be designed "from scratch" to provide a completely new inspection or metrology system.

Computer system 36 of the system may be coupled to the detectors of the imaging system in any suitable manner (e.g., via one or more transmission media, which may include "wired" and/or "wireless" transmission media) such that the computer system can receive the output generated by the detectors during scanning of the specimen. Computer system 36 may be configured to perform a number of functions using the output of the detectors as described herein and any other functions described further herein. This computer system may be further configured as described herein.

This computer system (as well as other computer systems described herein) may also be referred to herein as a computer subsystem. Each of the computer subsystem(s) or system(s) described herein may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer subsystem(s) or system(s) may also include any suitable processor known in the art such as a parallel processor. In addition, the computer subsystem(s) or system(s) may include a computer platform with high speed processing and software, either as a standalone or a networked tool.

If the system includes more than one computer system, the different computer systems may be coupled to each other such that images, data, information, instructions, etc. can be sent between the computer systems as described further herein. For example, computer system 36 may be coupled to computer system(s) 102 (as shown by the dashed line in FIG. 1) by any suitable transmission media, which may include any suitable wired and/or wireless transmission media known in the art. Two or more of such computer systems may also be effectively coupled by a shared computer-readable storage medium (not shown).

Although the imaging system is described above as being an optical or light-based system, the imaging system may be an electron beam-based system. For example, in one embodiment, the energy directed to the specimen includes electrons, and the energy detected from the specimen includes electrons. In this manner, the energy source may be an electron beam source. In one such embodiment shown in FIG. 2, the imaging system includes electron column 122, which is coupled to computer system 124.

Figure 2:
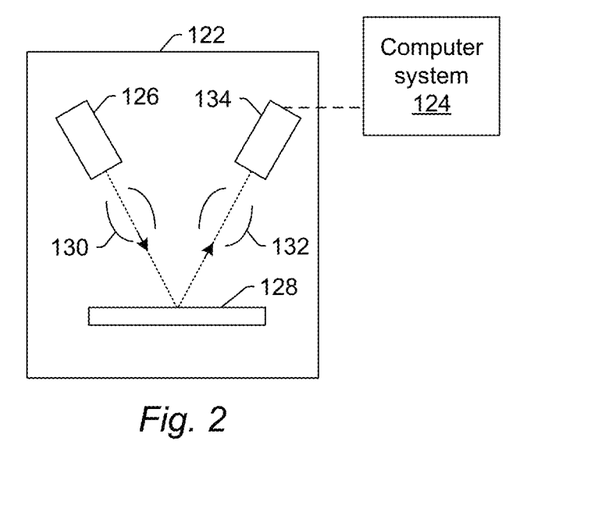

As also shown in FIG. 2, the electron column includes electron beam source 126 configured to generate electrons that are focused to specimen 128 by one or more elements 130. The electron beam source may include, for example, a cathode source or emitter tip, and one or more elements 130 may include, for example, a gun lens, an anode, a beam limiting aperture, a gate valve, a beam current selection aperture, an objective lens, and a scanning subsystem, all of which may include any such suitable elements known in the art.

Electrons returned from the specimen (e.g., secondary electrons) may be focused by one or more elements 132 to detector 134. One or more elements 132 may include, for example, a scanning subsystem, which may be the same scanning subsystem included in element(s) 130.

The electron column may include any other suitable elements known in the art. In addition, the electron column may be further configured as described in U.S. Pat. No. 8,664,594 issued Apr. 4, 2014 to Jiang et al., U.S. Pat. No. 8,692,204 issued Apr. 8, 2014 to Kojima et al., U.S. Pat. No. 8,698,093 issued Apr. 15, 2014 to Gubbens et al., and U.S. Pat. No. 8,716,662 issued May 6, 2014 to MacDonald et al., which are incorporated by reference as if fully set forth herein.

Although the electron column is shown in FIG. 2 as being configured such that the electrons are directed to the specimen at an oblique angle of incidence and are scattered from the specimen at another oblique angle, it is to be understood that the electron beam may be directed to and scattered from the specimen at any suitable angles. In addition, the electron beam system may be configured to use multiple modes to generate images of the specimen (e.g., with different illumination angles, collection angles, etc.). The multiple modes of the electron beam system may be different in any image generation parameter(s) of the system.

Computer system 124 may be coupled to detector 134 as described above. The detector may detect electrons returned from the surface of the specimen thereby forming electron beam images of the specimen. The electron beam images may include any suitable electron beam images. Computer system 124 may be configured to perform any of the functions described herein using the output of the detector and/or the electron beam images. Computer system 124 may be configured to perform any additional step(s) described herein. A system that includes the imaging system shown in FIG. 2 may be further configured as described herein.

FIG. 2 is provided herein to generally illustrate a configuration of an electron beam-based imaging system that may be included in the embodiments described herein. As with the optical system described above, the electron beam system configuration described herein may be altered to optimize the performance of the system as is normally performed when designing a commercial inspection or metrology system. In addition, the systems described herein may be implemented using an existing inspection, metrology, or high resolution defect review system (e.g., by adding functionality described herein to an existing inspection, metrology, or defect review system) such as tools that are commercially available from KLA. For some such systems, the embodiments described herein may be provided as optional functionality of the system (e.g., in addition to other functionality of the system). Alternatively, the system described herein may be designed "from scratch" to provide a completely new system.

Although the imaging system is described above as being a light-based or electron beam-based system, the imaging system may be an ion beam-based system. Such an imaging system may be configured as shown in FIG. 2 except that the electron beam source may be replaced with any suitable ion beam source known in the art. In addition, the imaging system may be any other suitable ion beam-based imaging system such as those included in commercially available focused ion beam (FIB) systems, helium ion microscopy (HIM) systems, and secondary ion mass spectroscopy (SIMS) systems.

The imaging systems described herein may be configured to generate output, e.g., images, of the specimen with multiple modes. In general, a "mode" is defined by the values of parameters of the imaging system used for generating images of a specimen (or the output used to generate images of the specimen). Therefore, modes that are different may be different in the values for at least one of the parameters of the imaging system (other than position on the specimen at which the output is generated). In this manner, the images may be generated by the imaging system with two or more different values of a parameter of the imaging system. For example, in an optical imaging system, different modes may use different wavelength(s) of light for illumination. The modes may be different in the illumination wavelength(s) as described further herein (e.g., by using different light sources, different spectral filters, etc.) for different modes. In addition, as noted above, the imaging system may include more than one illumination channel. As such, different illumination channels may be used for different modes. The modes may be different in any one or more alterable parameters (e.g., illumination polarization(s), angle(s), wavelength(s), etc., detection polarization(s), angle(s), wavelength(s), etc.) of the imaging system.

In a similar manner, the images generated by the electron beam imaging system may include images generated by the electron beam imaging system with two or more different values of a parameter of the electron beam imaging system. The multiple modes of the electron beam imaging system can be defined by the values of parameters of the electron beam imaging system used for generating images for a specimen. Therefore, modes that are different may be different in the values for at least one of the electron beam parameters of the electron beam imaging system. For example, different modes may use different angles of incidence for illumination.

The imaging system embodiments described herein may be configured for inspection, metrology, defect review, or another quality control related process performed on the specimen. For example, the embodiments of the imaging systems described herein and shown in FIGS. 1 and 2 may be modified in one or more parameters to provide different imaging capability depending on the application for which they will be used. In one such example, the imaging system shown in FIG. 1 may be configured to have a higher resolution if it is to be used for defect review or metrology rather than for inspection. In other words, the embodiments of the imaging systems shown in FIGS. 1 and 2 describe some general and various configurations for an imaging system that can be tailored in a number of manners that will be obvious to one skilled in the art to produce imaging systems having different imaging capabilities that are more or less suitable for different applications.

As noted above, the imaging system may be configured for directing energy (e.g., light, electrons) to and/or scanning energy over a physical version of the specimen thereby generating actual images for the physical version of the specimen. In this manner, the imaging system may be configured as an "actual" imaging system, rather than a "virtual" system. However, a storage medium (not shown) and computer system(s) 102 shown in FIG. 1 may be configured as a "virtual" system. In particular, the storage medium and the computer system(s) are not part of imaging system 100 and do not have any capability for handling the physical version of the specimen but may be configured as a virtual inspector that performs inspection-like functions, a virtual metrology system that performs metrology-like functions, a virtual defect review tool that performs defect review-like functions, etc. using stored detector output. Systems and methods configured as "virtual" systems are described in commonly assigned U.S. Pat. No. 8,126,255 issued on Feb. 28, 2012 to Bhaskar et al., U.S. Pat. No. 9,222,895 issued on Dec. 29, 2015 to Duffy et al., and U.S. Pat. No. 9,816,939 issued on Nov. 14, 2017 to Duffy et al., which are incorporated by reference as if fully set forth herein. The embodiments described herein may be further configured as described in these patents. For example, a computer system described herein may be further configured as described in these patents.

The system includes one or more computer systems, which may include any of the computer systems described further herein, configured for clustering dies on a specimen based on colors assigned to the dies responsive to predicted defect densities in the dies determined from measurements performed on the specimen thereby generating initial die clusters. "Predicted" as that term is used herein is synonymous with the terms simulated, estimated, and approximated, and a "predicted defect density" is generally defined as a defect density that would likely be detected on a specimen by an imaging system and that is determined from data unrelated to defects on the specimen, e.g., by modeling.

In this manner, measurements may be performed on the specimen by one of the imaging systems described herein or any other suitable metrology tool known in the art. In another embodiment, the measurements are not performed for defect detection on the specimen. For example, although any defects that are present on the specimen may affect the measurements of the specimen, the measurements are not performed to detect defects on the specimen. Instead, the measurements may include any suitable metrology type measurements like thickness of one or more films formed on the specimen, characteristics of patterned features like dimensions, side wall angles, roughness, shape, etc., other roughness on the specimen like film roughness, overlay of the features on one layer with the features on another layer of the specimen, and variations in any such characteristics across the specimen.

The measurements may include measurements for the layer of the specimen for which the process will be performed and/or for another layer of the specimen. For example, the measurements may include measurements of one or more structures formed on a layer underlying an upper layer on which the process will be performed possibly in combination with measurements of one or more structures on the upper layer.

Any of such measurements may be performed in any suitable manner known in the art and with any of the imaging systems described herein or any other suitable metrology tool known in the art. In addition, the measurements may be performed by the embodiments described herein. However, the measurements may be performed by another method or system and then acquired by the computer system(s) of the embodiments described herein (e.g., from a shared computer-readable medium accessible by both the computer system(s) and the other method or system).

The measurements may then be used to predict defect densities in the dies on the specimen. Colors may then be assigned to the dies based on the predicted defect densities and then die clustering may be performed for the dies based on the assigned colors thereby generating the initial die clusters. Each of these steps may be performed as described further herein.

Although some steps may be described herein with respect to dies on the specimen, the steps described herein may be performed for any other areas on the specimen. Those areas may correspond to a design area on the specimen other than a die, like a field. However, those areas may not have any correspondence to the design. For example, the wafer area may be artificially separated into a regular grid of tiles that may or may not be independent of the design formed on the specimen. For example, the tiles may be larger than the repeating patterned areas (e.g., dies) on the wafer, the tiles may be smaller than the repeating patterned areas, a tile may contain portions of two different repeating areas, etc. The tiles may also be non-overlapping, i.e., mutually exclusive, portions of the wafer. The steps described herein may then be performed for the tiles in the grid in the same manner as they are described herein with respect to dies. The terms "dies," "tiles," and "grid cells" are used interchangeably herein.

In one embodiment, the measurements are performed on the specimen by a metrology tool, and the process includes an inspection process. In this manner, the embodiments described herein may use metrology results to determine one or more parameters of inspection. In other words, the embodiments described herein may be configured for metrology guided inspection (MGI). As shown in step 600 of FIG. 6, for example, the input to the computer system(s) may be a grid (e.g., a die level wafer map such as that shown in FIG. 3) with predictions (i.e., the predicted defect densities). The grid may therefore also be referred to as an MGI grid.

In one embodiment, the predicted defect densities include defect density probability distributions. For example, the metrology measurements may be performed at as many measurements points on the specimen as desired. The metrology results may then be used to determine various distributions in the metrology results across the specimen, i.e., the metrology measurements as a function of space across the specimen. In this manner, the metrology measurements may also be used to determine various distributions in the defect density probabilities determined from the metrology measurements in the spatial domain of the specimen. For example, a defect density probability may be determined at various locations on the specimen from the metrology measurements and then a distribution in the defect density probability may be determined based on the defect density probability as a function of location. The predicted defect density probability distribution may then be used as described herein for clustering. The embodiments may combine clustering and image processing steps described further herein to extract local maxima of a defect density probability distribution on a wafer.

In another embodiment, the predicted defect densities are determined as a continuous distribution of values across the specimen. This is an important difference between the embodiments described herein and currently used methods and systems. For example, while there are several currently used clustering algorithms, none of them are designed to extract local maxima from a continuous distribution (instead of clustering isolated points like discrete locations of defects detected on a specimen).

In some embodiments, the predicted defect densities are generated by a machine learning (ML) model trained with training data that includes ground truth defect information for one or more training specimens and the measurements performed on the one or more training specimens. For example, a defect probability distribution may be computed using a ML model trained with inspection results as ground truth and one or more metrology data sources as features such as optical critical dimension (OCD) and patterned wafer geometry (PWG) data generated for one or more layers on one or more wafers. In this manner, after the ML model is trained with metrology measurements and ground truth defect information for one or more training specimens, the measurements described herein may be input to the ML model to generate predicted defect densities on the specimen.

The ML model may have any suitable configuration known in the art and may be trained in any suitable manner known in the art. The computer system(s) may or may not be configured to train the ML model. For example, the computer system(s) or another method or system may be configured to train the ML model as described above. Training the ML model may include inputting the metrology measurements for the training specimen(s) into the ML model and altering one or more parameters of the ML model until the output of the ML model matches (exactly or within some predetermined tolerance) the ground truth defect densities determined for the training specimen(s). The parameters of the ML model that are altered may include any alterable parameters of the ML model such as, for example, weights and biases of one or more convolutional layers.

The embodiments described herein may or may not include the ML model. For example, the ML model may or may not be included in one or more component(s) (not shown) executed by the computer system(s). When the ML model is executed by the computer system(s), the computer system(s) may generate the predicted defect densities by inputting the metrology results such as those described further herein into the ML model.

In this manner, the embodiments described herein may generate the predicted defect densities. However, the embodiments described herein may simply acquire or receive the predicted defect densities from another method or system that generated them. In other words, one method or system may be configured for generating the predicted defect densities, and another method or system may be configured for using the predicted defect densities as described herein.

The embodiments described herein may also be performed with predicted defect densities generated in any other manner. In other words, the embodiments described herein are not limited in the manner in which the predicted defect densities are generated or acquired. For example, as long as the predicted defect densities are correct, the embodiments described herein can be used to enhance the results by pointing out the local maxima locations in the predicted defect densities.

Figure 6:
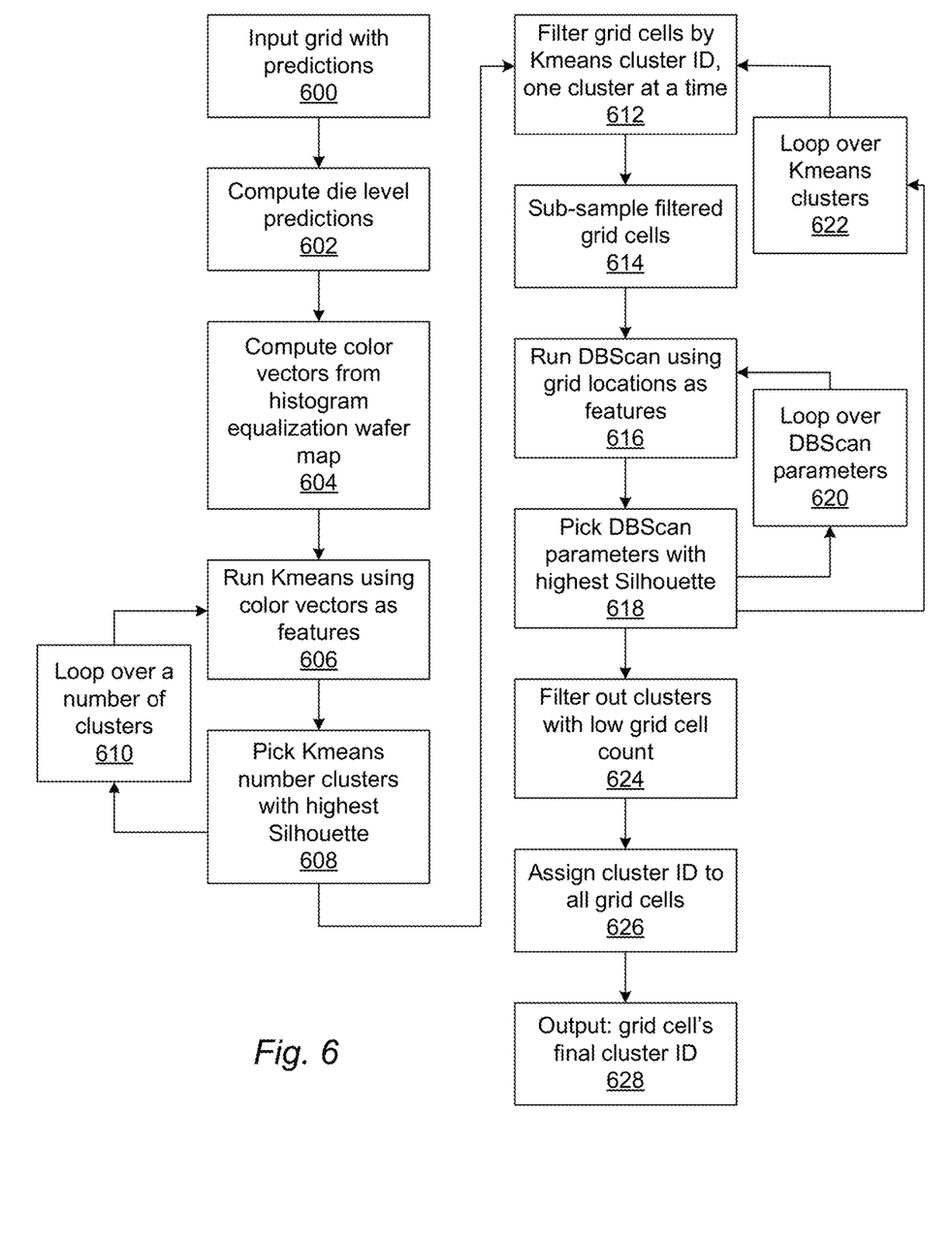
FIG. 6 is a flow chart illustrating an embodiment of steps that may be performed for generating final die clusters as described herein.

In an additional embodiment, the computer system(s) are configured for assigning the colors to the dies by determining a predicted defect density per die, determining initial colors for the dies based on the predicted defect density per die, and determining final colors for the dies by histogram equalization. For example, the computer system(s) may plot the defect density with RGBA colors and then use histogram equalization to enhance contrast. RGBA=RBGAlpha, where the alpha parameter is a number between 0.0 (fully transparent) and 1.0 (not transparent at all). As shown in step 602, for example, the computer system(s) may be configured to compute die level predictions. Step 602 may include aggregating the predictions at the die level by computing the mean of all the values that land in the same die. In this manner, the input to this step may be the predictions initially computed in a dense grid (thousands of values per die) and after this step, each die may have a single aggregated value (e.g., mean). The computer system(s) may also be configured for computing color, e.g., RGBA, vectors from a histogram equalization wafer map, as shown in step 604. Histogram equalization may be performed in any suitable manner known in the art.

Figure 3:
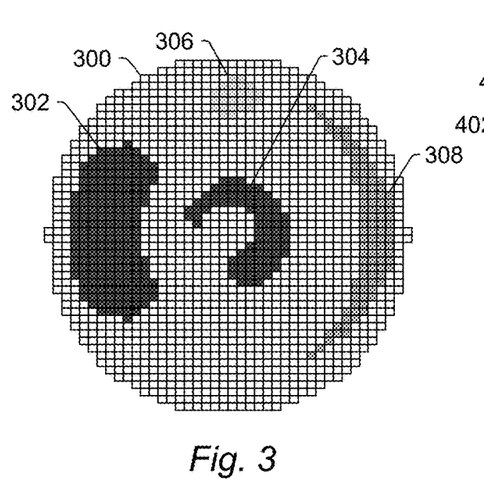
FIG. 3 is a schematic diagram illustrating one example of a die level wafer map of defect density probabilities with four localized clusters.

Wafer map 300 shown in FIG. 3 is a gray level version of a color, die level wafer map of defect density probabilities with four localized clusters (302, 304, 306, and 308) easily detected by the human eye. For example, it is difficult to convey in a black and white drawing how easily these clusters can be detected by a user in a color wafer map. So to give an example of how these clusters may appear to a user in a color map, cluster 302 may be bright yellow-to-yellow green, cluster 304 may be yellow-green and more green than cluster 302, cluster 306 may be bright, light green, and cluster 308 may be light green that is darker than cluster 306. The remaining dies in the map may have a relatively dark blue color with some dies around clusters 302 and 304 having a slightly greenish blue shade.

It is not possible to run any clustering algorithm based on die/grid locations, so the clustering step of the embodiments described herein focuses on the color space (or defect density probability value) for each die in the grid. As described further herein, the embodiments can separately identify all four clusters shown in FIG. 3. The wafer map shown in FIG. 3 and the other wafer maps described herein are merely included as wafer map examples for aiding the understanding of the embodiments described herein. Obviously, the wafer maps generated by any embodiment of the systems and methods described herein would vary depending on the specimens for which they are performing the steps described herein.

In one embodiment, the clustering is not performed based on locations of the dies on the specimen. For example, the clustering step may include taking a die level map of defect density probability and assigning each die to a cluster based on the color assigned to it and not any location information associated with the dies. Each cluster identifies regions of substantially equal levels of predicted defect density, i.e., predicted defect density values that are not different from each other by more than a predetermined value. In a further embodiment, the clustering includes applying a K-means method to the colors assigned to the dies. For example, as shown in step 606 of FIG. 6, the computer system(s) may be configured to run KMeans using color vectors as features. The K-means (or KMeans) method may include any suitable K-means method known in the art performed in any suitable manner known in the art.

In another embodiment, the clustering includes applying a K-means method to the colors assigned to the dies and selecting results of the K-means method having a highest silhouette score as one of the initial die clusters. A "silhouette score" is a measure of the "quality" of the clusters generated by an algorithm. A set of "good quality" clusters would include well-separated clusters, and the components (in this case dies) included in each of those clusters would be relatively close together. In this manner, the higher the silhouette scores, the better the clusters the algorithm generated. For example, the computer system(s) may identify clusters by highest silhouette score using KMeans on this color space. In one such example, as shown in step 608, the computer system(s) may be configured to pick KMeans number clusters with highest Silhouette score.

As shown in step 610, the computer system(s) may be configured to loop steps 606 and 608 over a number of clusters. The number of clusters may be a predetermined number such as between 2 and 6 clusters. The predetermined number of clusters may be a target number of the clusters, which may be determined or set by a user or in any other manner known in the art. For example, K-means supports specification of cluster count, i.e., a target cluster count and/or a maximum cluster count. The predetermined number of clusters may be determined based on how many clusters are expected vs. how much time is allowed for finding them (more clusters=more time involved), and this number can be modified based on the data as appropriate.

Figure 4:
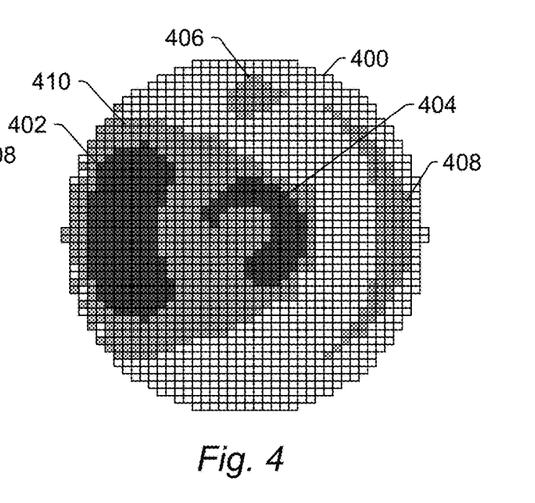
FIG. 4 is a schematic diagram illustrating one example of a die level wafer map of clustering results generated by KMeans.

Unlike currently used clustering algorithms that are distance based, clustering in color-space may fail to resolve clusters that are spatially separated. This can be seen by the clusters identified by the KMeans algorithm in wafer map 400 shown in FIG. 4. The KMeans method has identified two clusters in the wafer map shown by the differently shaded portions of the dies. For example, one cluster has been identified as the dies included in shaded portions 402 and 404, and another cluster has been identified as the dies included in shaded portions 406, 408, and 410. Therefore, as can be seen by this figure, clustering based on color may result in some clusters containing dies that are spatially separated from each other in the map. The cluster that includes portions 406, 408, and 410 does correspond to similar color (probability) in the original wafer map but should be identified as different clusters if the goal is to identify local maxima for diversity sampling. Similarly, the cluster that includes portions 402 and 404 in color space is really two clusters in location space.

The computer system(s) are also configured for analyzing the initial die clusters in location space to determine if any of the initial die clusters contain two or more die clusters. In this manner, each of the initial die clusters may be separately analyzed to determine if it contains more than one die cluster. For example, as shown in step 612 of FIG. 6, the computer system(s) may be configured to filter grid cells (or dies) by KMeans cluster ID, one cluster at a time. This step may be performed only to separate the grid cells into their initial die clusters for analysis purposes. In addition, the computer system(s) may be configured to sub-sample filtered grid cells, as shown in step 614. The sub-sampling may be performed randomly and may be performed when time is a factor. For example, if the algorithm used for the analyzing step does not scale linearly and there are time constraints (a runtime of seconds versus minutes for each iteration), then the sub-sampling step may be performed to help the analyzing step be fast enough. The sub-sampling step is therefore optional.

In one embodiment, the analyzing step includes applying a density-based spatial clustering of applications with noise (DBScan) method to the initial die clusters. In this manner, the computer system(s) may identify clusters within each previously found cluster using DBScan in location space. For example, as shown in step 616, the computer system(s) may be configured to run DBScan using grid locations (e.g., x and y locations) as features. The embodiments described herein may therefore use KMeans in color space (which may be contrast-enhanced) followed by DBScan in location space. The DBScan method may include any suitable such data clustering algorithm or method known in the art. In addition, although DBScan may be one particularly advantageous way to perform the analyzing step, analyzing the initial die clusters may be performed using any other location space-based clustering algorithm or method.

In another embodiment, the analyzing step includes applying a DBScan method to the initial die clusters multiple times with different parameters of the DBScan method, identifying results of the DBScan method applied with each of the different parameters having a highest silhouette score, and determining if any of the initial die clusters contain two or more die clusters based on the identified results. For example, the computer system(s) may pick DBScan parameters with highest Silhouette, as shown in step 618. The computer system(s) may also loop over DBScan parameters, as shown in step 620, to thereby perform steps 616 and 618 with different DBScan parameters. These steps may be performed to find the parameters of the DBScan clustering algorithm that give the best clusters (those having the highest silhouette score) by brute force by iterating over them. So for each set of parameters, DBScan may be run, and the quality of the clusters may be computed. The results generated for each set of parameters may then be used to pick the parameters that had the best score and then performing the analyzing step with the results generated with the selected parameters.

Once the DBScan steps are performed for one cluster, the computer system(s) may loop over KMeans clusters as shown in step 622 so that steps 612, 614, 616, 618, and 620 are performed for the next cluster identified by KMeans. In this manner, steps 612, 614, 616, 618, and 620 may be independently performed for each cluster found by KMeans or other initial clustering performed in color space. For example, if 6 clusters are found by running KMeans, then the looping may be performed 6 times. In this manner, these steps are performed for each KMeans cluster found in color space so that each of the KMeans clusters can be split by DBScan in location space if appropriate. In the example shown in FIG. 4, kidney shaped cluster 402 and shrimp shaped cluster 404 may be in the same cluster based on color, but in location space they are quite far apart and therefore two different clusters ultimately. Therefore, they may be in the same cluster after KMeans and different clusters after DBScan.

In one such embodiment, prior to the determining step, the analyzing includes eliminating any of the two or more die clusters having a number of dies lower than a predetermined die count from the identified results for any of the initial die clusters. For example, as shown in step 624 of FIG. 6, the computer system(s) may filter out clusters with relatively low grid cell count. This step may be performed to avoid "background clusters." The predetermined die count or relatively low grid cell count may be determined in any suitable manner, e.g., based on input from a user or determined dynamically, e.g., based on number of dies or grid cells in an initial die cluster. In this manner, the results of the DBScan method having the highest silhouette score for an initial die cluster may be examined to determine if any of the clusters in the results have a number of dies or grid cells lower than the predetermined die or grid cell count. Any of those clusters may then be eliminated from the die clusters in the DBScan results for that initial die cluster. In this manner, any relatively small clusters identified by the DBScan results may be not separated from the initial die cluster into a different die cluster or may be assigned to a background cluster or group that is not designated as a final die cluster. Eliminating substantially small clusters identified by DBScan can simplify the inspection process and improve its throughput with relatively little, or even no, adverse affect on its defect detection performance.

Figure 5:
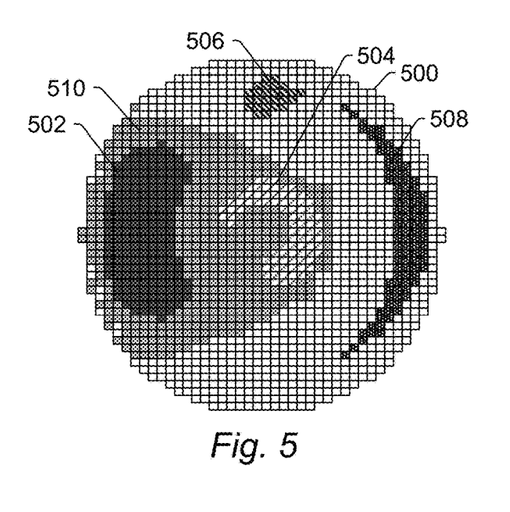
FIG. 5 is a schematic diagram illustrating one example of a die level wafer map of final die clusters that may be generated by the embodiments described herein.

In one embodiment, the clustering and analyzing steps (e.g., KMeans and DBScan) are performed such that the initial die clusters and the two or more die clusters contained in any of the initial die clusters correspond to local maxima in the predicted defect densities. For example, the embodiments described herein adapt clustering algorithms to find local maxima clusters in the defect density probability distribution of the wafer. The embodiments described herein allow the computer system(s) to resolve the local maxima as shown in wafer map 500 in FIG. 5. In particular, every original cluster is correctly identified. More specifically, final die clusters 502, 504, 506, and 508 shown in wafer map 500 correspond to local maxima 302, 304, 306, and 308, respectively, in wafer map 300 shown in FIG. 3. In addition, the final die clusters may include cluster 510, which is not evident in wafer map 300 but is more apparent in a color version of the defect density probability die level map, and which may be identified by the clustering and analyzing steps described herein.

The computer system(s) are further configured for designating the initial die clusters that do not contain two or more die clusters and the two or more die clusters contained in any of the initial die clusters as final die clusters. In other words, if DBScan determines that an initial die cluster does not contain two or more die clusters, then that initial die cluster may be identified as a final die cluster. If DBScan determined that an initial die cluster contains two or more die clusters, then the two or more die clusters are identified as final die clusters and the original, initial die cluster is not identified as a final die cluster. As shown in step 626 of FIG. 6, the computer system(s) may assign cluster IDs to all grid cells. In this manner, the designating step may include assigning a cluster ID to all grid cells regardless of whether they are in their original, initial die cluster or a different die cluster identified by DBScan. In addition, any non-clustered grid cells in a wafer map may also be assigned a cluster ID indicating they are non-clustered or background cells. The cluster ID may have any suitable form (e.g., numeric, alphanumeric, etc.) and format known in the art.

The computer system(s) may also generate output, as shown in step 628, which may include the final cluster IDs for the grid cells and any other information for the final die clusters generated by the embodiments described herein. The generated output may have any suitable form or format known in the art that enables the output to be used in setting up a process as described further herein. The computer system(s) are also configured for storing information for the final die clusters for use in setting up a process performed on the specimen, which may be performed as described further herein.

In one embodiment, the computer system(s) are configured for determining median predicted defect densities for the final die clusters and eliminating any of the final die clusters having the median predicted defect densities below a predetermined threshold. For example, the nature of the clustering algorithms described herein means that every die may be part of a cluster whether it belongs to a local maximum or not (e.g., cluster 510 shown in FIG. 5 and another cluster that may include all of the dies that are not shaded or patterned, i.e., the solid white dies, in FIG. 5). In the embodiments described herein, it is easy to discard one or more clusters such as cluster 510 and the cluster of unshaded or unpatterned dies by considering the median value for each cluster and discarding the clusters having a median value below a user-defined threshold.

In another embodiment, the computer system(s) are configured for determining median predicted defect densities for the final die clusters and sorting the final die clusters based on the median predicted defect densities. For example, the computer system(s) may be configured to rank the final clusters by median cluster probability, e.g., from highest median cluster probability to lowest. The ranking step may be performed after the final cluster IDs are assigned. Therefore, this step may be performed after all of the other steps shown in FIG. 6. This ranking may be used in the setup process described further herein.

In an additional embodiment, the computer system(s) are configured for setting up the process by determining sampling of the process based on the information for the final die clusters. For example, the local maxima clusters identified by the embodiments described herein may be used to aid in diversity sampling. One advantage of the embodiments described herein is therefore that they can be used to find local maxima in a defect density probability distribution on a wafer, which can be used to help find defects that are not part of the global maxima. In this manner, tool users can bias the inspection to explore areas that would otherwise be ignored due to the stronger signal of other areas.

The diversity sampling that may be performed with the embodiments described herein is therefore fundamentally different from previously used, so-called diversity sampling. For example, diversity sampling methods that were previously developed operated on a population of defects to find the defects that were most different from each other. In this manner, the diversity sampling aimed to try to find the most interesting and most different defects. Such diversity sampling can be useful for a number of applications such as defect discovery.

In contrast, the diversity sampling that is performed by or with the embodiments described herein is based on diversity in predicted defect densities in different areas of a wafer. For example, the final die clusters may correspond to local maxima in predicted defect density, which is primarily the goal of the embodiments described herein. Then, sampling for each of the final die clusters may be determined independently based on their respective predicted defect densities. For example, for a final die cluster that is expected to have a substantially high defect density, a relatively dense inspection sampling plan may be selected so that the final die cluster can be examined more thoroughly, e.g., for diagnostic purposes. In contrast, for a final die cluster that is expected to have a substantially low defect density, a substantially dense inspection sampling plan may be selected, because a less dense sample plan may miss all or too many of the relatively sparse defects. In this manner, the sampling plans that are independently selected or generated for each of the final die clusters may vary depending on, at least in part, the goals of the inspection (e.g., monitoring a well-established process for possible process excursions vs. defect discovery for a less-established process).

The embodiments described herein may be performed in metrology post-processing as part of an MGI analysis flow. In addition, the process may be configured for consuming cluster IDs and using them for inspection sampling. In this manner, the main application in which the embodiments described herein may be used is for computing the defect probability distribution (from previous metrology step measurements) and combining that with inspection tool sampling plan capabilities to thereby help to come up with a better dynamic inspection plan.

The final die clusters may therefore function as a kind of care area (CA) on the specimen that may be used instead of or in addition to other CAs on the specimen. For example, the parameters of the process used within the different areas on the wafer corresponding to the final die clusters may be different in the same way that CA parameters are. In this manner, the one or more computer systems may be configured for designating some or all of the final die clusters as CAs for a process performed on the specimen with the imaging system. Designating some or all of the final die clusters as CAs may include generating some CA identification for the final die cluster(s), which may include any alphanumeric or other suitable identification known in the art. The output of this step may include the CA designations and any other information generated for the CAs such as specimen location, size, etc.

Instead of (or in addition to) sampling, one or more other parameters of the process may be selected independently for each of the final die clusters. For example, the parameters may include an indication of the final die clusters for which the process is to be performed, e.g., in which final die clusters inspection is to be performed versus those it is not. The other parameter values selected independently for each of the final die clusters may include different sensitivities used in the inspection recipe to detect defects on the specimen. The different sensitivities may be controlled by, for example, one or more thresholds used to separate the image into pixels that correspond to defects vs pixels that do not correspond to defects. In addition or alternatively, the computer system(s) may be configured for optimizing the threshold per final die cluster to obtain a desired number of defects. Such a sensitivity may be set using a preset capture rate ("cap rate" or "caprate") for the different final die clusters. For example, the inspection goal (e.g., desired nuisance rate+desired defect caprate per defect type) can be specified per final die cluster.

Although selecting inspection recipe parameters may be performed separately for different final die clusters, each of the inspection recipe parameters selected separately and independently for the final die clusters may be combined into a single inspection recipe that is performed for the specimen. In addition, selecting the inspection recipe parameters may be performed for multiple final die clusters at the same time to thereby optimize the inspection recipe parameter for multiple final die clusters.

In a further embodiment, the measurements and the process are performed on the specimen with different tools. For example, generally, the systems described herein are configured either for metrology or inspection, but not both. Therefore, the measurements that are input to the steps described herein may be generated by one tool configured for metrology, and the process performed using the results of the steps described herein may be performed by a different tool configured for inspection. The steps described herein may be performed by either of these tools or none of them. For example, the embodiments described herein may be performed on-tool by one or more computer systems (e.g., computer system 36 shown in FIG. 1 or computer system 124 shown in FIG. 2) included in or coupled to a metrology tool and/or an inspection tool or off-tool by computer system(s) (e.g., computer system(s) 102 shown in FIG. 1) that are not included in or directly coupled to any of such tools.

In this manner, the systems described herein may or may not include an imaging system such as that shown in FIGS. 1 and 2. If the system includes the imaging system, then the same computer system(s) that generate the final die cluster information and possibly setup a process based on that information may also be configured to then perform the setup process on a specimen. If the system does not include the imaging system, then another system or method may be configured for performing the setup process on a specimen. In addition, one system may be configured for generating and storing the information for the final die clusters as described herein, another system may be configured for setting up a process using the stored information, and yet another system may be configured for performing the setup process.

The computer system(s) may be configured for storing information for the final die clusters for use in setting up a process performed on a specimen such as inspection of the specimen and/or for performing the process on the specimen once it has been setup. For example, the computer system(s) may be configured to store the information in a recipe or by generating a recipe for the process in which the final die clusters will be used. A "recipe" as that term is used herein can be generally defined as a set of instructions that can be used by a tool to perform a process on a specimen. In this manner, generating a recipe may include generating information for how a process is to be performed, which can then be used to generate the instructions for performing that process. The information for the final die clusters that is stored by the computer system(s) may include any information that can be used to identify and/or use the final die clusters (e.g., such as a file name and where it is stored, and the file may include information for the final die clusters such as final die cluster IDs, final die cluster locations, etc.).

The computer system(s) may be configured for storing the information for the final die clusters in any suitable computer-readable storage medium. The information may be stored with any of the results described herein and may be stored in any manner known in the art. The storage medium may include any storage medium described herein or any other suitable storage medium known in the art. After the information has been stored, the information can be accessed in the storage medium and used by any of the method or system embodiments described herein, formatted for display to a user, used by another software module, method, or system, etc. For example, the embodiments described herein may generate an inspection recipe as described above. That inspection recipe may then be stored and used by the system or method (or another system or method) to inspect the specimen to thereby generate information (e.g., defect information) for the specimen.

The computer system(s) and/or the imaging system may be configured to use the results of one or more steps described herein to perform the inspection process on the specimen. Such an inspection process may produce results for any defects detected on the specimen such as information, e.g., location, etc., of the bounding boxes of the detected defects, detection scores, information about defect classifications such as class labels or IDs, etc., or any such suitable information known in the art. The results for the defects may be generated by the computer system(s) and/or imaging system in any suitable manner. The results for the defects may have any suitable form or format such as a standard file type. The computer system(s) and/or imaging system may generate and store the results such that the results can be used by the computer system(s) and/or another system or method to perform one or more functions for the specimen or another specimen of the same type. For example, that information may be used by the computer system(s) or another system or method for sampling the defects for defect review or other analysis, determining a root cause of the defects, etc.

Functions that can be performed using such information also include, but are not limited to, altering a process such as a fabrication process or step that was or will be performed on the inspected specimen or another specimen in a feedback or feedforward manner. For example, the computer system(s) may be configured to determine one or more changes to a process that was performed on a specimen inspected as described herein and/or a process that will be performed on the specimen based on the detected defect(s). The changes to the process may include any suitable changes to one or more parameters of the process. The computer system(s) preferably determine those changes such that the defects can be reduced or prevented on other specimens on which the revised process is performed, the defects can be corrected or eliminated on the specimen in another process performed on the specimen, the defects can be compensated for in another process performed on the specimen, etc. The computer system(s) may determine such changes in any suitable manner known in the art. Such changes may also be determined using results of other processes described herein.

Those changes can then be sent to a semiconductor fabrication system (not shown) or a storage medium (not shown) accessible to the computer system(s) and the semiconductor fabrication system. The semiconductor fabrication system may or may not be part of the system embodiments described herein. For example, the computer system(s) and/or imaging system described herein may be coupled to the semiconductor fabrication system, e.g., via one or more common elements such as a housing, a power supply, a specimen handling device or mechanism, etc. The semiconductor fabrication system may include any semiconductor fabrication system known in the art such as a lithography tool, an etch tool, a chemical-mechanical polishing (CMP) tool, a deposition tool, and the like.

As described herein, therefore, the embodiments can be used to setup a new process or recipe. The embodiments may also be used to modify an existing process or recipe, whether that is a process or recipe that was used for the specimen or was created for one specimen and is being adapted for another specimen.

Each of the embodiments of each of the systems described above may be combined together into one single embodiment.

Another embodiment relates to a computer-implemented method for generating information for use in setting up a process performed on a specimen. The method includes the clustering, analyzing, designating, and storing steps described above. Each of the steps of the method may be performed as described further herein. The method may also include any other step(s) that can be performed by the imaging system and/or computer system(s) described herein. The clustering, analyzing, designating, and storing steps are performed by one or more computer systems, which may be configured according to any of the embodiments described herein. In addition, the method described above may be performed by any of the system embodiments described herein.

Figure 7:
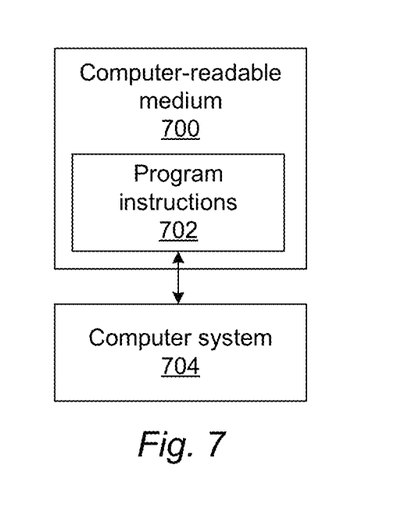
FIG. 7 is a block diagram illustrating one embodiment of a non-transitory computer-readable medium storing program instructions for causing a computer system to perform a computer-implemented method described herein.

An additional embodiment relates to a non-transitory computer-readable medium storing program instructions executable on a computer system for performing a computer-implemented method for generating information for use in setting up a process performed on a specimen. One such embodiment is shown in FIG. 7. In particular, as shown in FIG. 7, non-transitory computer-readable medium 700 includes program instructions 702 executable on computer system 704. The computer-implemented method may include any step(s) of any method(s) described herein.

Program instructions 702 implementing methods such as those described herein may be stored on computer-readable medium 700. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension) or other technologies or methodologies, as desired.

Computer system 704 may be configured according to any of the embodiments described herein.

Further modifications and alternative embodiments of various aspects of the invention will be apparent to those skilled in the art in view of this description. For example, methods and systems for generating information for use in setting up a process performed on a specimen are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

The invention claimed is:

1. A system configured for generating information for use in setting up a process performed on a specimen, comprising:
    one or more computer systems configured for:
        clustering dies on a specimen based on colors assigned to the dies responsive to predicted defect densities in the dies determined from measurements performed on the specimen thereby generating initial die clusters;
        analyzing the initial die clusters in location space to determine if any of the initial die clusters contain two or more die clusters;
        designating the initial die clusters that do not contain two or more die clusters and the two or more die clusters contained in any of the initial die clusters as final die clusters; and
        storing information for the final die clusters for use in setting up a process performed on the specimen.

2. The system of claim 1, wherein the predicted defect densities comprise defect density probability distributions.

3. The system of claim 1, wherein the predicted defect densities are determined as a continuous distribution of values across the specimen.

4. The system of claim 1, wherein said clustering and analyzing are performed such that the initial die clusters and the two or more die clusters contained in any of the initial die clusters correspond to local maxima in the predicted defect densities.

5. The system of claim 1, wherein the measurements are performed on the specimen by a metrology tool, and wherein the process comprises an inspection process.

6. The system of claim 1, wherein the measurements are not performed for defect detection on the specimen.

7. The system of claim 1, wherein the predicted defect densities are generated by a machine learning model trained with training data comprising ground truth defect information for one or more training specimens and the measurements performed on the one or more training specimens.

8. The system of claim 1, wherein the one or more computer systems are further configured for assigning the colors to the dies by determining a predicted defect density per die, determining initial colors for the dies based on the predicted defect density per die, and determining final colors for the dies by histogram equalization.

9. The system of claim 1, wherein the clustering comprises applying a K-means method to the colors assigned to the dies.

10. The system of claim 1, wherein the clustering comprises applying a K-means method to the colors assigned to the dies and selecting results of the K-means method having a highest silhouette score as one of the initial die clusters.

11. The system of claim 1, wherein the clustering is not performed based on locations of the dies on the specimen.

12. The system of claim 1, wherein the analyzing comprises applying a density-based spatial clustering of applications with noise (DBScan) method to the initial die clusters.

13. The system of claim 1, wherein the analyzing comprises applying a density-based spatial clustering of application with noise (DBScan) method to the initial die clusters multiple times with different parameters of the DBScan method, identifying results of the DBScan method applied with each of the different parameters having a highest silhouette score, and determining if any of the initial die clusters contain two or more die clusters based on the identified results.

14. The system of claim 13, wherein prior to the determining, the analyzing further comprises eliminating any of the two or more die clusters having a number of dies lower than a predetermined die count from the identified results for any of the initial die clusters.

15. The system of claim 1, wherein the one or more computer systems are further configured for determining median predicted defect densities for the final die clusters and eliminating any of the final die clusters having the median predicted defect densities below a predetermined threshold.

16. The system of claim 1, wherein the one or more computer systems are further configured for determining median predicted defect densities for the final die clusters and sorting the final die clusters based on the median predicted defect densities.

17. The system of claim 1, wherein the one or more computer systems are further configured for setting up the process by determining sampling of the process based on the information for the final die clusters.

18. The system of claim 1, wherein the measurements and the process are performed on the specimen with different tools.

19. A non-transitory computer-readable medium, storing program instructions executable on a computer system for performing a computer-implemented method for generating information for use in setting up a process performed on a specimen, wherein the computer-implemented method comprises:

clustering dies on a specimen based on colors assigned to the dies responsive to predicted defect densities in the dies determined from measurements performed on the specimen thereby generating initial die clusters;

analyzing the initial die clusters in location space to determine if any of the initial die clusters contain two or more die clusters;

designating the initial die clusters that do not contain two or more die clusters and the two or more die clusters contained in any of the initial die clusters as final die clusters; and storing information for the final die clusters for use in setting up a process performed on the specimen.

20. A computer-implemented method for generating information for use in setting up a process performed on a specimen, comprising:

clustering dies on a specimen based on colors assigned to the dies responsive to predicted defect densities in the dies determined from measurements performed on the specimen thereby generating initial die clusters;

analyzing the initial die clusters in location space to determine if any of the initial die clusters contain two or more die clusters;

designating the initial die clusters that do not contain two or more die clusters and the two or more die clusters contained in any of the initial die clusters as final die clusters; and storing information for the final die clusters for use in setting up a process performed on the specimen, wherein the clustering, analyzing, designating, and storing are performed by one or more computer systems.

* * * * *